United States Patent [19]

Murai

[11] Patent Number: 4,962,421
[45] Date of Patent: Oct. 9, 1990

[54] COLOR IMAGE GENERATING APPARATUS

[75] Inventor: Kazuo Murai, Tokyo, Japan

[73] Assignee: Ricoh Company, Ltd., Tokyo, Japan

[21] Appl. No.: 269,696

[22] Filed: Nov. 10, 1988

[30] Foreign Application Priority Data

Nov. 11, 1987 [JP] Japan .................................. 62-284675

[51] Int. Cl.[5] .............................................. H04N 1/46
[52] U.S. Cl. .......................................... 358/76; 358/78
[58] Field of Search ............................. 358/80, 76, 78

[56] References Cited

U.S. PATENT DOCUMENTS

| 4,752,822 | 6/1988 | Kawamura | 358/80 |
| 4,797,712 | 1/1989 | Hayashi et al. | 358/76 |

FOREIGN PATENT DOCUMENTS

| 0144188 | 6/1985 | European Pat. Off. | 358/80 |
| 59-171289 | 9/1984 | Japan | 358/80 |
| 60-220659 | 11/1985 | Japan | 358/80 |
| 60-232542 | 11/1985 | Japan | 358/76 |

Primary Examiner—James J. Groody
Assistant Examiner—Mark R. Powell
Attorney, Agent, or Firm—Oblon, Spivak, McClelland, Maier & Neustadt

[57] ABSTRACT

A color image generating apparatus has a memory circuit for memorizing at least a part of an original image in a test print mode operation of the apparatus. An output circuit is used for reading the memorized image from the memory circuit and repeatedly outputting this image, a plurality of times on one display. Image processing circuit for processing the image with a different print condition at each time of repeatedly outputting the image from the output circuitry is used. A plurality of sample images are each printed in a different print condition and displayed on one test sample print paper so that an optimal desired image is selected from the plurality of test sample images.

8 Claims, 11 Drawing Sheets

Fig. 9

| XBLK0 YBLK0 | XBLK0 YBLK1 | XBLK0 YBLK2 | XBLK0 YBLK3 | XBLK0 YBLK4 |
|---|---|---|---|---|
| XBLK1 | | | | |
| XBLK2 | | | | |
| XBLK3 | | | | |
| XBLK4 | | | | |
| XBLK5 | | | | |
| XBLK6 | | | | XBLK6 YBLK4 |

COLOR IMAGE GENERATING APPARATUS

BACKGROUND OF THE INVENTION

The present invention relates to an image generating apparatus or image processor such as a color printer. More particularly, the invention relates to a means for adjusting the color balance of the image to be printed.

As an apparatus to which the present invention is applicable, there is used an image generating unit (image processing unit) which generates visual color image, such as a laser printer utilizing an electrophotographic technique, a thermal printer or an ink jet printer. Such an image generating unit is used for example as a copying apparatus.

When a colored original is to be copied by the copying apparatus, a user sometimes wishes to change the color balance of the copy as he or she likes, irrespective of that the apparatus is adjusted to print the copy as the original color or not, or in case that the original is too reddish, for example.

In an analogue type color printer such as the electrophotographic color printer, the color balance is adjusted by changing the bias voltage of the development for each of color elements yellow (Y), magenta (M) and cyan (C).

On the other hand, in a digital type color printer, the color balance can be digitally adjusted since the original is digitally processed after being read by a sensor.

In either type of color printer, when three colors, that is red (R), green (G) and blue (B), are considered, red (R), for example, is weakened either by reducing the red color element or by strengthening green (G) and blue (B). However, in either case, the color tone of the entire print is changed. Therefore, the user has to go through several times of trial and error each time changing the color balance of the copy so as to get a copy colored as desired, which is very troublesome and inefficient.

SUMMARY OF THE IVNENTION

The present invention was made considering the above points. It is therefore an object of the present invention to provide an image generating apparatus which makes it possible to generate an optimal image as desired easily and efficiently by simple manual operation.

The object of the invention can be achieved by an image generating apparatus comprising a memory device which memorizes a part of a whole of an image of an original in a test mode operation; an output device which reads out the image memorized in the memory device and outputs a plurality of the same profiles of the read out image on one display area; and an image processing device which processes each profile of the read out image in a different treatment condition.

An advantage of the above-mentioned apparatus is that an optimal print with a desired color tone can be readily obtained without any troublesome manual adjusting operations in a normal printing mode by specifying one of the test sample images each being differently processed in the test print mode operation, when the apparatus is used as a color printer.

Further objects and advantages of the present invention will be apparent from the following description of the preferred embodiments of the invention as illustrated in the accompanying drawings.

BRIEF DESCRIPTION OF THE DRAWINGS

FIG. 9 is an explanatory view for explaining matrix blocks of the memorized image of FIG. 8, in which twenty four blocks each processed in a print condition different from that of the other blocks are output on a paper, dividing it in matrix.

DESCRIPTION OF THE PREFERRED EMBODIMENTS

The present invention will now be described hereinafter in relation to an embodiment of the invention with reference to the drawings.

Figure 1:
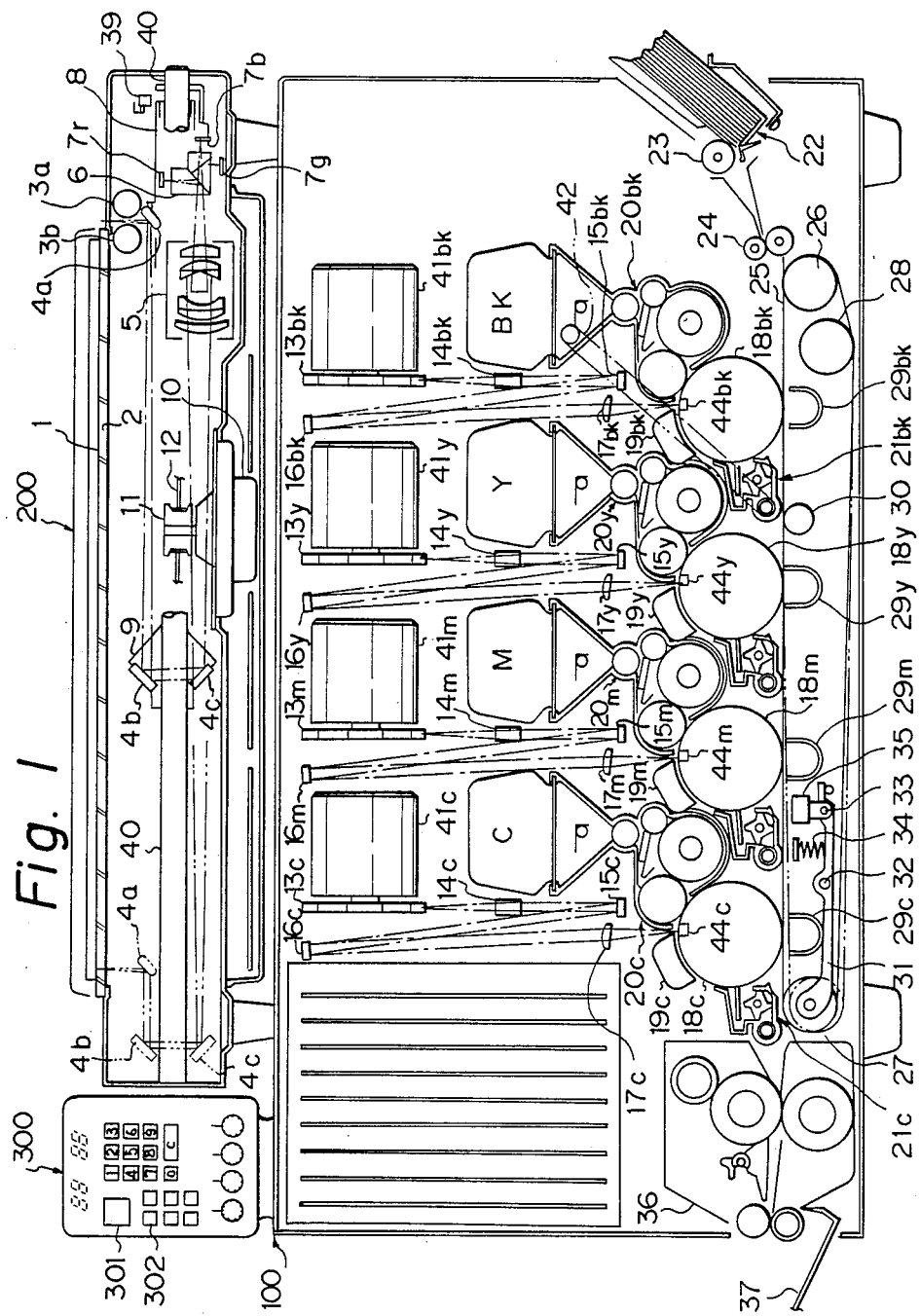
FIG. 1 is a constructional view of an example of a structure of a color copying apparatus (color printer) to which the present invention is applied.

FIG. 1 illustrates an example of a structure of a color copying apparatus to which the present invention is applied. The structure of the color copying apparatus (referred to as color printer hereinafter) is as follows.

Reference numeral 100 designates a printer body. Reference numeral 200 designates a color scanner and reference numeral 300 designates a console board. An original 1 is placed on a platen (contact glass) 2 of the color scanner 200 1 and irradiated by fluorescent lamps 3a and 3b. The light from the lamps is reflected by the original 1 placed on the contact glass 2. The reflection light is further reflected by a first mirror 4a, a second mirror 4b and a third mirror 4c, respectively, which mirrors are movable along the contact glass surface.

The light reflected by the mirrors passes through an imaging lens assembly 5 and propagates to a dichroic prism 6 where the light is spectrally analyzed to three light spectra, red (R), green (G) and blue (B). Three CCDs (charge-coupled devices) are disposed for detecting the three spectra, respectively. The red spectrum is introduced to a CCD 7r. The green spectrum is introduced to a CCD 7g and the blue spectrum is introduced to a CCD 7b, respectively.

The fluorescent lamps 3a and 3b and the first mirror 4a are mounted on a first carriage 8. The second mirror 4b and the third mirror 4c are mounted on a second carriage 9. The second carriage 9 moves at a half speed as that of the first carriage 8 so that the light paths of the reflection light from the original to the CCDs 7r, 7g and 7b, respectively, are always maintained constant during the movement of the first and second carriages 8 and 9 from the right to the left at the time of scanning the original. The carriages 8 and 9 are mounted on and move along a guide bar 40 which is disposed in parallel with the contact glass 2 on which the original to be copied is placed. A carriage drive pulley 11 is secured to a shaft of a carriage drive motor 10. The pulley 11 is coupled to a carriage drive wire 12 which is wound around a rotatable pulley (not shown) disposed on the second carriage 9. The above constructional arrangement is made so that, by driving the motor 10 forward or reverse, the first carriage 8 and the second carriage 9 move forward (from the right to the left in the drawing) for scanning and reading the original or return to the initial position at the right end of the movable range, in which the speed of the second carriage 9 is maintained half as that of the first carriage 8.

Figure 2:
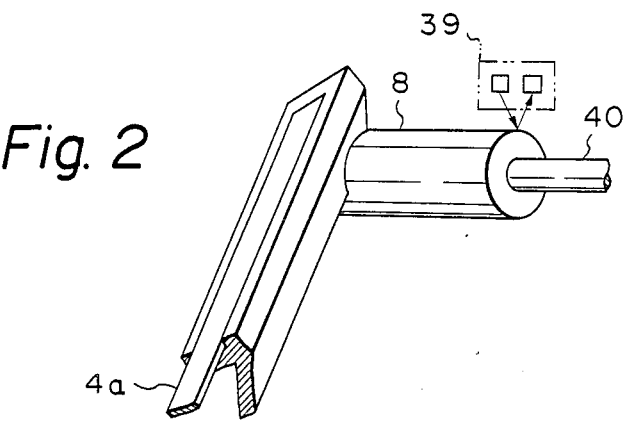
FIG. 2 is a partial perspective view of a home position sensor arranged in the copying apparatus of FIG. 1.

When the first carriage 8 is being at a home position (initial position), as shown in FIG. 1, the carriage 8 is detected by a home position sensor 39, which is a reflection type photosensor in this particular embodiment. The carriage 8 is sensed in a manner as shown in FIG. 2, for example, and driven as described below.

When the first carriage 8 is moved leftward (FIG. 1) to carrying out an exposure scan of the original, and out of the home position (right end), the sensor 39 does not receive the reflection light from the carriage, which confirms the movement of the carriage out of the home position. When the carriage 8 returns to the home position, the sensor 39 detects the reflection light from the carriage 8. The carriage 8 is stopped upon detection of the reflection light therefrom by the sensor 39.

Figure 6:
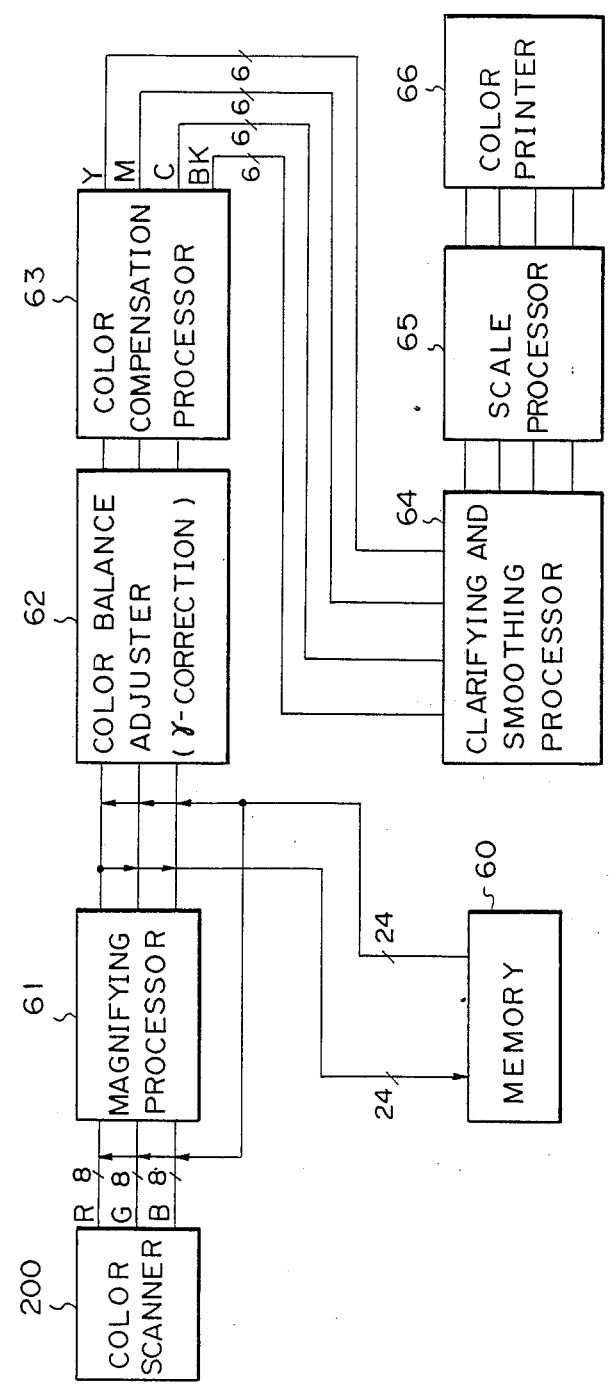
FIG. 6 is a funcitonal block diagram illustrating a flow of operation carried out by an image processing device arranged in the copying apparatus of FIG. 1.

With the color scanner 200 having the structure mentioned above, color data of red (R), green (G) and blue (B) of the original are detected and read by the CCDs 7r, 7g and 7b, respectively, and processed by a data processing circuit represented in FIG. 6. In accordance with the processed data, semiconductor laser devices described later and disposed in the printer body 100 are driven in accordance with ON-OFF modulation control method.

The laser beam emitted from each of the semiconductor laser devices is reflected by a polygon mirror 13bk, 13y, 13m, 13c and passes through an f−θ lens 14bk, 14y, 14m, 14c to a fourth mirror 15bk, 15y, 15m, 15c which reflects the laser beam toward a fifth mirror 16bk, 16y, 16m, 16c which further reflects the laser beam to a photosensitive drum 18bk, 18y, 18m, 18c through a cylindrical lens 17bk, 17y, 17m, 17c for compensating for face inclination of the polygon mirror. The beam forms a latent image on the photosensitive drum surface.

Each polygon mirror 13bk, 13y, 13m, 13c is attached on a rotary shaft of a corresponding drive motor 41bk, 41y, 41m, 41c which drives the polygon mirror to rotate at a constant speed. The aforementioned laser beam is reflected by each rotary polygon mirror to scan the photosensitive drum surface along the longitudinal axis thereof (perpendicular to the drawing of FIG. 1).

Figure 3:
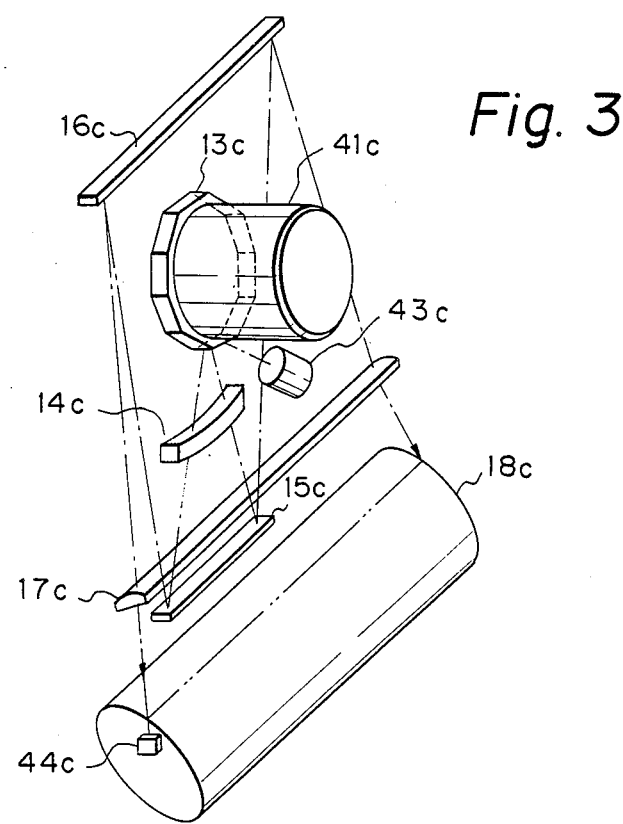
FIG. 3 is a partial perspective view of a laser scanning system of a cyan color recording device arranged in the copying apparatus of FIG. 1.

A laser scanning system of the cyan color recording unit is illustrated in FIG. 3 in detail as an example of the structure of the scanner. Reference 43c designates a semiconductor laser device. A photosensor 44c comprising a photoelectric converter element is disposed on an end face of the photosensitive drum 18c and at an end of a laser scanning line (dash two dot line) on the drum surface along the longitudinal axis thereof, so that the sensor 44c receives the scanning laser beam at the end of the scanning line. The scanning of one line starts at a point when the output of the sensor 44c changes from a laser detection signal to a nondetection signal. That is, a laser beam detection pulse signal from the sensor 44c is processed to be used as a synchronizing pulse signal for starting the scanning of one line on the photosensitive drum. Each of the other three color recording devices, magenta recording device, yellow recording device and black recording device has the same structure as the above mentioned cyan recording device illustrated in FIG. 3.

The structure of the copying apparatus of the present invention is further described with reference again to FIG. 1. The surface of the photosensitive drum 18bk, 18y, 18m, 18c is evenly charged with a predetermined negative voltage by a charger 19bk, 19y, 19m, 19c which is connected to a negative high voltage generator (not shown).

When the laser beam modulated by the recording signal is irradiated onto the photosensitive drum surface, the electric charge on the drum surface is erased. In this operation, the laser is turned off for dark parts of the original, while the laser is turned on for light parts of the original. With such an operational arrangement, with regard to the area on the drum surface corresponding to the dark part of the original, the charge is maintained at a voltage of −800 V, while with regard to the area on the drum surface corresponding to the light part of the original the charge is reduced to about −100 V, so that an electrostatic latent image is formed on the drum surface in accordance with the shade depth of the original. The electrostatic latent image is developed by a black development unit 20bk, a yellow development unit 20y, a magenda development unit 20m and a cyan development unit 20c so that a color image is formed on each of the photosensitive drums 18bk, 18y, 18m, 18c by toner of black, yellow, magenta and cyan, respectively. The color toner in each development unit is stirred so as to be charged with positive voltage. Each development unit is biased to about −200 V by a bias voltage generator. The positively charged toner sticks to the portion of the drum surface where the surface voltage is larger than the bias voltage so that a toner image is formed on the drum surface corresponding to the original image.

On the other hand, a sheet of record paper is fed out from a paper cassette 22 by a feed roller 23 and transferred to a conveyor belt 25 at predetermined timing by a pair of resist rollers 24. A plurality of record papers for transfer print are stacked in the cassette 22. The record paper is conveyed by the conveyor belt 25 and passes under the photosensitive drums 18bk, 18y, 18m, 18c, respectively, in this order. During passing through each of the photosensitive drums, the toner image in each color of black, yellow, magenta and cyan is transferred to the record paper by the function of a transfer device (charger) 29bk, 29y, 29m, 29c, each arranged at the position corresponding to the photosensitive drum 18bk, 18y, 18m, 18c, respectively, and disposed under the conveyor belt 25.

After transferring the toner images to the record paper, the conveyor belt 25 conveys and transfers the record paper to a heat fixing device 36 which fixes the toner images on the record paper which is then delivered to a discharge tray 37.

On the other hand, the toner which is not transferred and remaining on the photosensitive drum surface is removed by a cleaner units 21bk, 21y, 21m, 21c, respectively.

The cleaner unit 21bk for cleaning the black toner on the photosensitive drum 18bk comprises a toner collection pipe 42 which is connected to the black development unit 20bk so that the toner removed from the drum surface by the cleaner unit is conveyed to the black development unit 20bk for reuse.

Note that the color toners other than the black toner, i.e. yellow toner, magenta toner and cyan toner are not collected for reuse. The reason for this is that each of the yellow, magenta and cyan drums have unnecessary toners of different color of the previous development units. These toners are transferred back from the paper and attached to the drum surface.

Figure 4:
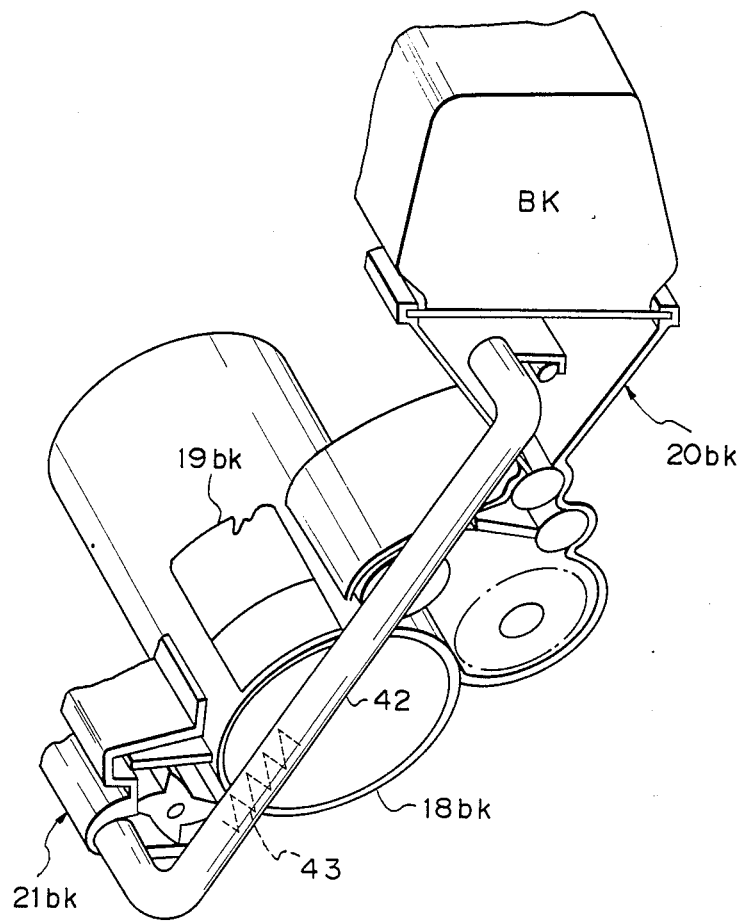
FIG. 4 is a partial perspective view of a toner collection pipe for reuse arranged in the copying apparatus of FIG. 1 and partially cut away for illustrating inside thereof.

The toner collection pipe 42 is illustrated in detail in FIG. 4. A toner collection auger 43 is disposed in the C-shaped pipe 42. The auger 43 is freely rotatable in the pipe 42. The auger 43 is connected to a not shown drive means which rotates the auger in a predetermined direction so that the toner accumulated in the cleaner unit 21bk is conveyed to the development unit 20bk by screw pumping function of the auger 43.

The conveyor belt 25 which conveys the record paper from the drum 18bk toward the drum 18c is wound around and between an idle roller 26 and a drive roller 27, and tensioned by idle rollers 28 and 30. The drive roller 27 drives the belt 25 to circulate in the anticlockwise direction.

The drive roller 27 is rotatably mounted on a left end of a lever 31 which is pivoted on a shaft 32. On a right end of the lever 31, a plunger 35 of a not shown solenoid for setting a black mode print is rotatably mounted. A compression spring 34 is disposed at a position between the plunger 35 and the shaft 32 to urge the lever 31 to rotate in the clockwise direction. When the printer is arranged in a color mode operation and the solenoid for setting the black mode print is not energized, the conveyor belt 25 comes in contact with the photosensitive drums 44bk, 44y, 44m, 44c, as illustrated in a solid line in FIG. 1. With this arrangement, the toner image formed by each color toner on the photosensitive drum surface is transferred to the record paper at each of the four drums during conveyance thereof along the four drums, the black drum, the yellow drum, the magenta drum, and the cyan drum, by the conveyor belt 25, so that a color image is formed on the record paper.

On the other hand, when the solenoid for setting the black print mode is energized, the lever 31 is rotated in the anticlockwise direction against the resilient force of the compression coil spring 34, so that the drive roller 27 is moved downward by about 5 mm, thus the conveyor belt 25 is separated from the three drums 44y, 44m, 44c from the left, keeping in contact with only the black drum 44bk disposed on the right end of the four drums. With this black print mode arrangement, the record paper on the conveyor belt 25 comes in contact only with the photosensitive drum 44bk, and the paper is separated from the other three photosensitive drums. Therefore, only the black toner image is transferred to the record paper to form a monochrome image on the paper. The paper printed with the black toner is not soiled by the other three toners, since the paper does not come in contact with the drums 44y, 44m, 44c for development; which drums have the yellow toner, the magenta toner and the cyan toner, respectively, on the surface thereof. In the manner mentioned above, the original is copied and printed in black in accordance with the same operational manner as copied in a black monochrome printer.

On the console board 300, a copy start button 301, a copy mode selection button 302, input key buttons, a character display and display lamps are disposed. When the power is turned on, the printer is set as the color print mode and the copy mode selection button 302 is unlighted. When the copy mode selection button 302 is pushed, the button is lighted and the printer is set as the black print mode so that the black print mode setting solenoid is energized. When the copy mode selection button 302 is again pushed, the button is not lighted and the printer is set in the color print mode again.

Funcitonal timing of the copying apparatus according to the present invention is described hereinafter with reference to the time chart of FIG. 5.

Figure 5:
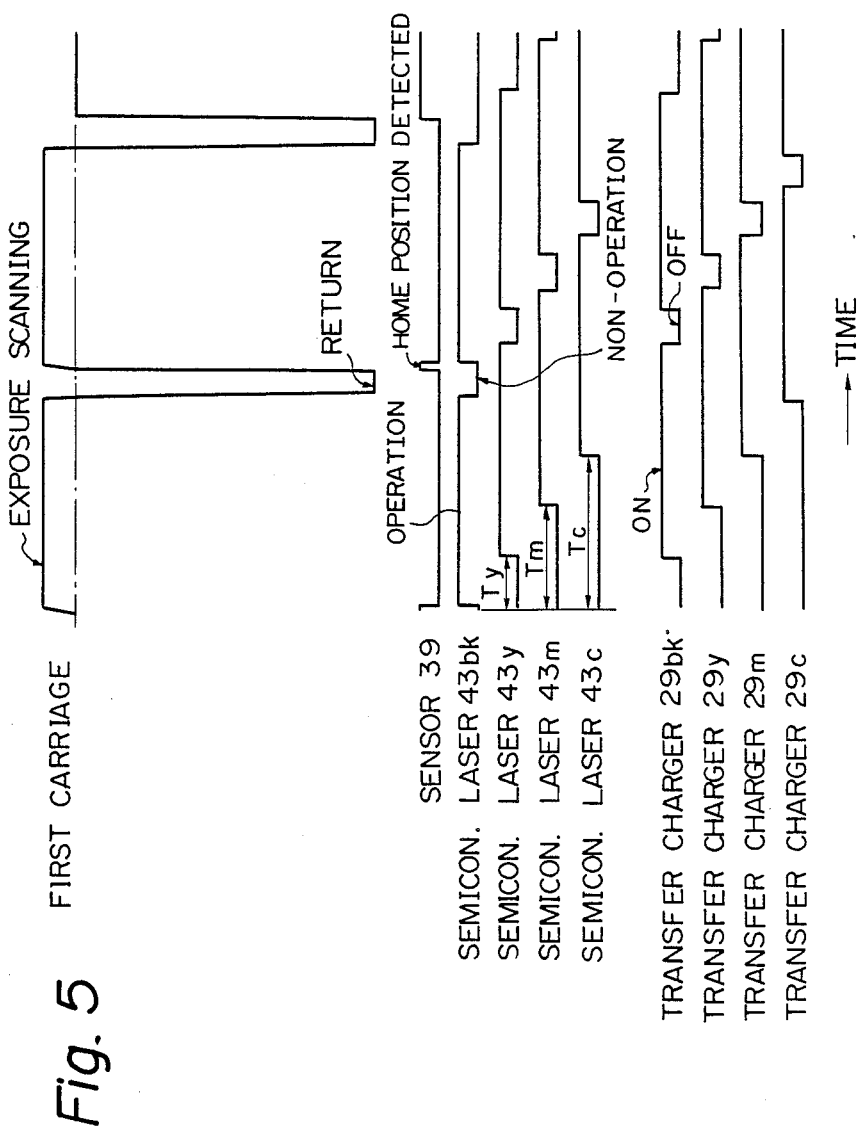
FIG. 5 is a time chart for representing functional timing of the copying apparatus of FIG. 1.

FIG. 5 represents a time flow of the funciton of the copying apparatus wherein two same full color copies are produced. The semiconductor laser device 43bk starts the operation thereof in accordance with the modulation signal which is generated in response to the original image to be copied, at the same time as the first carriage starts the exposure scanning operation. The other three semiconductor laser devices 43y, 43m and 43c are retarded to start the operation for predetermined time Ty, Tm and Tc, respectively. The time Ty, Tm and Tc each is necessary for the conveyor belt 25 to move from the position of the first photosensitive drum 44bk to the position of each of subsequent three photosensitive drums 44y, 44m and 44c, respectively.

Each of the transfer chargers 29bk, 29y, 29m and 29c are energized after a predetermined time delay from the time when the semiconductor laser device 43bk, 43y, 43m, 43c each start their operation. The time delay corresponds to the time necessary for the photosensitive drum to rotate the move the laser irradiated point on the surface thereof to the position facing to the transfer charger.

The function of the above mentioned embodiment of the present invention is further described hereinafter with reference to FIG. 6.

FIG. 6 represents the processing flow of the image processor means of the color printer according to the present invention. A color original is scanned by the aforementioned color scanner 200 which analyzes the original color into three color elements, i.e. red (R), green (G) and blue (B) by three CDs each having a color filter and transmits the detection signal of the original image to a variable magnification processor 61 in the form of digital signal.

The variable magnification processor 61 processes the transmitted input signal of the image data of red, green and blue to enlarge or reduce the magnification or rotate the image in accordance with the order signal.

This magnification process may be carried out after the color of the image data is compensated for. When the printer is set in the test print mode, a part of or an entire of the processed image data is memorized in a memory 60. The memorized data is output to a color balance adjuster 62 through the variable magnification processor 61. The memorized data may be directly transmitted to the color balance adjuster 62 without being processed by the variable magnification processor 61. The color balance adjuster 62 adjusts the tone of color with regard to red, green and blue in accordance with the output data from the memory 60, as described in detail later.

Note that when the print mode of the printer is selected to be set in a normal print mode rather than the test print mode, the image data processed by the variable magnification processor 61 is not memorized in the memory 60. In the normal print mode, the image data processed by the variable magnification processor 61 is directly transmitted to the color balance adjuster 62 without being input to the memory 60.

Then the color iamge data is transmitted to a color compensation processor 63 to compensate color and convert the color data to data to yellow, magenta and cyan. After that, the original image data is processed with a treatment of under color removal (VCR) on the basis of the data of yellow, magenta and cyan. Then the image data is converted to data of yellow (Y), magenta (M), cyan (C) and black (B). The image data is further processed by a clarifying and smoothing processor 64 which filters the data to stress the edge of the data or smooth the data with respect to yellow (Y), magenta (M), cyan (C) and black (B). After that, the image data is converted to binary image signals through a dither treatment by a scale processor 65 and tranmsitted to a color printer 66.

The function of the color printer according to the present invention in the test print mode operation is further explained below.

When the test print mode is selected, the color scanner 200 reads the color of the original by analyzing the original image into three colors, red, green and blue. The color image data output from the color scanner is transmitted to the memory 60 and a part of or an entirety of the data is memorized therein. The color image data is memorized in a manner as below.

1 Information of the fixed position of the image is read.

2 Information of the arbitrary position of the image is read by using a tablet or another adequate coordinate input means.

3 The image data is read after the original is reduced to a memory size.

4 Information of the arbitrary position of the original reduced to a desired size is read.

The embodiment of FIG. 10 described later uses a tablet as a reading means for reading the original image and inputting the image data.

Figure 7:
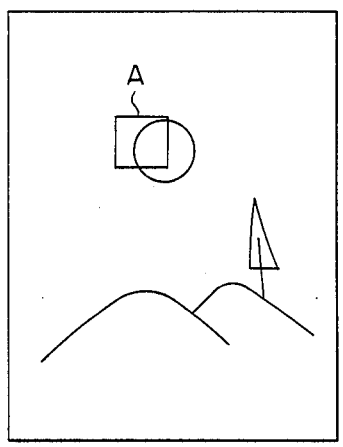
FIGS. 7(a) and 7(b) are explanatory views for explaining an example of an output from the copying apparatus of FIG. 1 in a test print mode operation processing a part of an original image.
Figure 7:
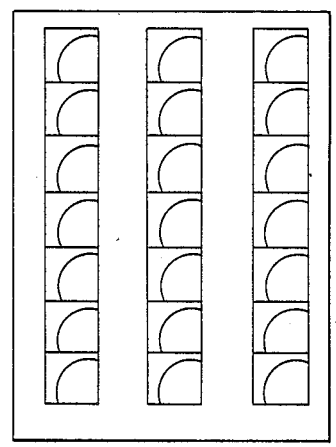
Figure 8:
FIG. 8 is an explanatory view for explaining memorized position data of the part of the image of the original on a coordinate.

FIG. 7(a) and FIG. 8 represent a memory area in the memory 60. A part of the memory area, for example, a small block A represented in the drawings is taken out and output to be printed repeatedly on one paper, as illustrated in FIG. 7(b). The block A is printed twenty seven times repeatedly on one paper as a test sample print, each time changing the color tone combination of red, green and blue in a manner that the strength of each of the three colors has three stages, i.e. standard, dark and light, thus total number of combination of the different tone of the three colors becomes $3^3 = 27$.

In the following example of the test copy mode operation of the color printer, the test sample is printed on a regular A3 size paper with a dot printer of 16 dots/mm.

First, for the sake of simplification of the circuit, the explanation is made under the condition that the image size is $1024 \times 1024$ dots for 64 mm $\times$ 64 mm, that one block of $1024 \times 1024$ dots from the point PA(601, 1500) on the coordinate of the original, as represented in FIG. 8, is input to the memory 60 by a tablet and that the memorized data of the block of $1024 \times 1024$ dots is repeatedly output from the memory as illustrated in FIG. 9. In this case, all of the blocks of $1024 \times 1024$ dots can not be represented on the paper, as can be seen from FIG. 9. FIG. 9 illustrates an arrangement of division of the paper into thirty five blocks in the form of matrix of seven rows (blocks XBLK 0 to 6 in the X direction) and five columns (blocks YBLK 0 to 4 in the Y direction). However, the right edge of the blocks in the fifth column YBLK 4 (dash line) and the lower edge of the blocks in the seventh row XBLK 6 (dash line) are out of the display area. Therefore, the number of the blocks which can be output or displayed on the paper, in this case, is twenty four, that is, 6 rows (XBLK 0 to XBLK 5)$\times$4 columns (YBLK 0 to YBLK 3).

Figure 10:
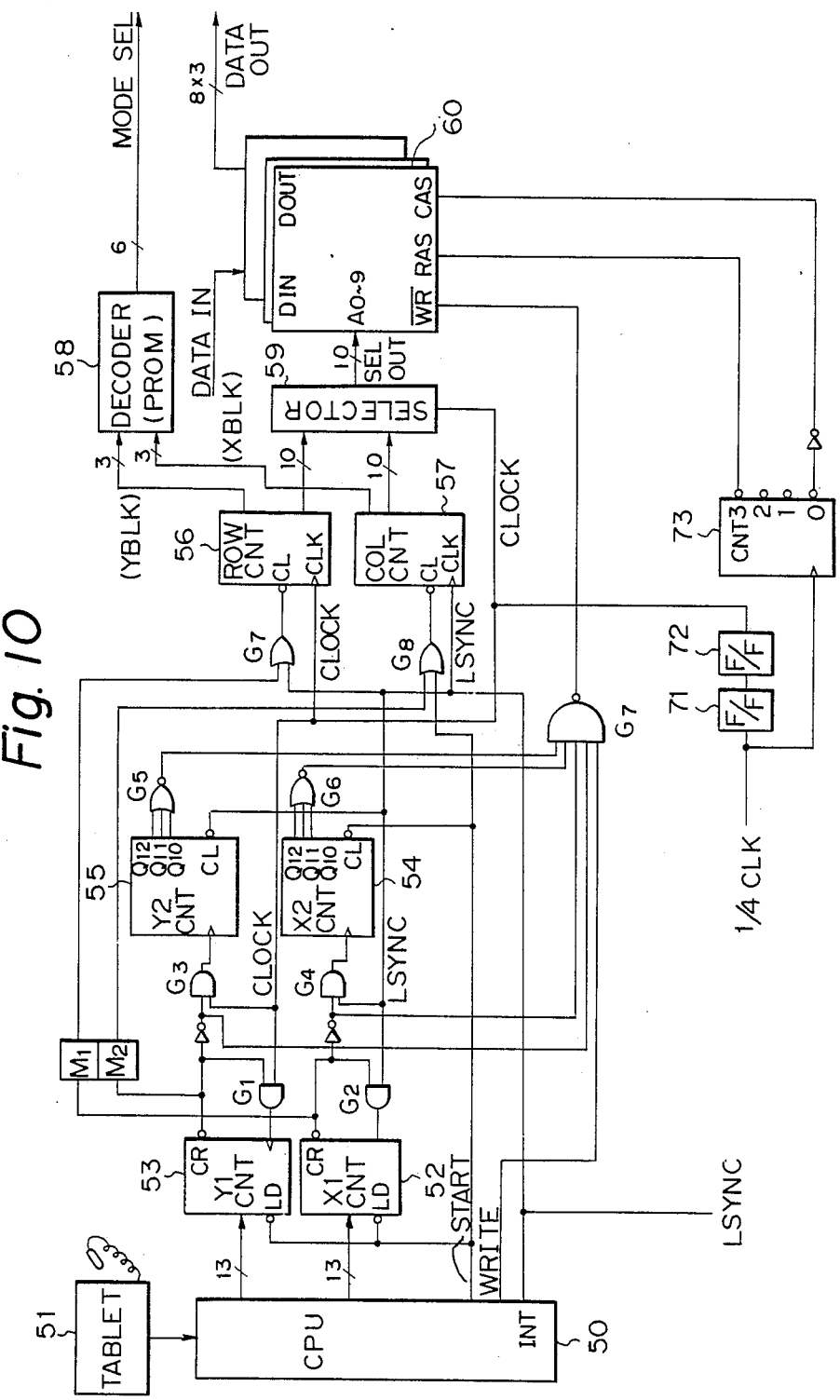
FIG. 10 is a circuit diagram of a processing device for inputting data of the original image into the memory to write the data therein.
Figure 11:
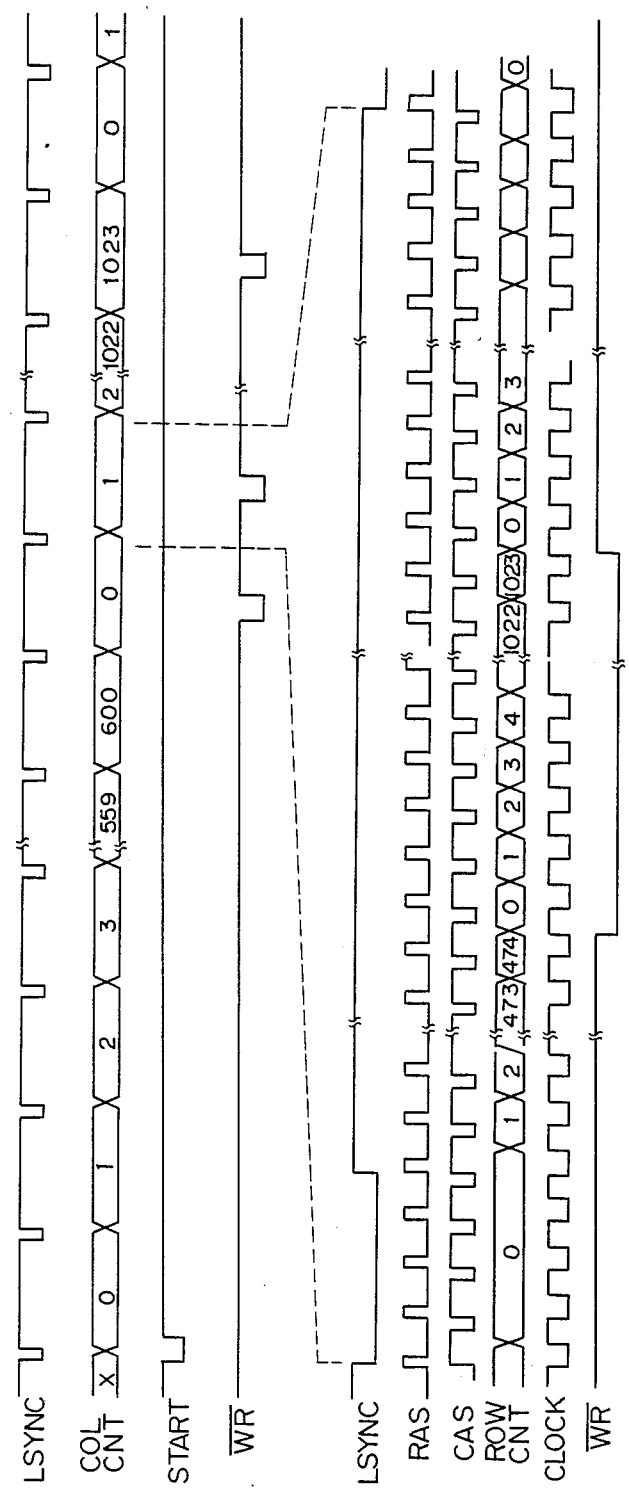
FIG. 11 is a time chart of the processing device of FIG. 10 in the operation of writing the data of the original image in the memory.

The circuit diagram of FIG. 10 is explained hereinafter with reference to the time chart of FIG. 11 which represents the timing for writing the image data memorized in the memory of the color printer according to the present invention.

FIG. 10 represents a circuit construction necessary for writing input data in the memory 60. The position of the read start point PA on the coordinate designated in FIG. 8 is read and input to a CPU 50 by a tablet 51. At the beginning of the copying operation, the coordinate data of the read start point PA is introduced and loaded to an X1 counter 52 and a Y1 counter 53 from the CPU 50 by a copy start signal (START). The X1 counter 52 and the Y1 counter 53 are a subtract counter to which the read start coordinate position data (601, 1500) is loaded. The X1 counter 52 counts down one decrement ($-1$) by a line synchronizing signal (LSYNC) until the count number reaches a predetermined value when a carry signal (CR) turns to "L" and the input to the counter is inhibited by an AND gate logical operator $G_z$. Also, the Y1 counter 53 counts down one decrement ($-1$) by a clock signal (CLOCK) of picture image element until the count number reaches a predetermined value when a carry signal (CR) turns to "L" and the input to the counter is inhibited by an AND gate logical operator $G_1$.

When the carry signal (CR) of the X1 counter 52 turns to "L", an X2 counter 54 counts an increment in accordance with the line synchronizing signal (LSYNC). Also, when the carry signal (CR) of the Y1 counter 53 turns to "L", a Y2 counter 55 counts an increment in accordance with the clock signal (CLOCK) of picture image element.

During each output of 10 to 12 bits from the largest bit position of the counters is representing the signal "L", that is, from the 602nd line to the 1024th line and from the 1501st dot to the 1024th dot, a terminal $\overline{WR}$ of the memory 60 (1M DRAM) is turned to "L", so that data of one bit is memorized in a memory area corresponding to the block A represented in FIG. 8 which block A comprises $1024 \times 1024$ dots, i.e. 1M.

In the example illustrated in FIG. 6, the memory requires 1M×24, since each of the three color signals comprises eight bits. An output of a row counter (ROW CNT) 56 and an output of a column counter (COL CNT) 57 are introduced to an address line of the memory 60 through a selector 59, matching with the timing of signals RAS and CAS represented in the time chart of FIG. 11. When the level of the image element clock signal (CLOCK) is "L" (low), the output of the row counter 56 is introduced to the address line of the memory 60 by the selector 59. On the other hand, the level of the clock signal is "H" (high), the output of the column counter 57 is introduced to the address line of the memory 60.

The row counter 56 and the column counter 57 are reset by the line synchronizing signal (LSYNC) and the start signal (START), respectively, and function as an 1024 notation scale counter so that the information of each of the row counter 56 and the column counter 57 can be read out from the area other than the writing area even when the apparatus is carrying out writing operation.

When the X1 counter 52 and the Y1 counter 53 count a predetermined number, respectively, and output a carry signal, one pulse of the output carrying signal is input to a reset terminal of each of the row counter 56 and the column counter 57 so as to reset the counter 56,57, irrespective of the count number thereof. After that, the counters function as a 1024 notation scale counter until the line synchronizing signal (LSYNC) and the start signal (START) are introduced thereto. This is because that ten bits from the least bit position are used for indicating the address of the data.

Also, a high level output "H" is transmitted from the CPU 50 to the terminal $\overline{WR}$ of the memory 60 during the writing operation thereof.

Figure 12:
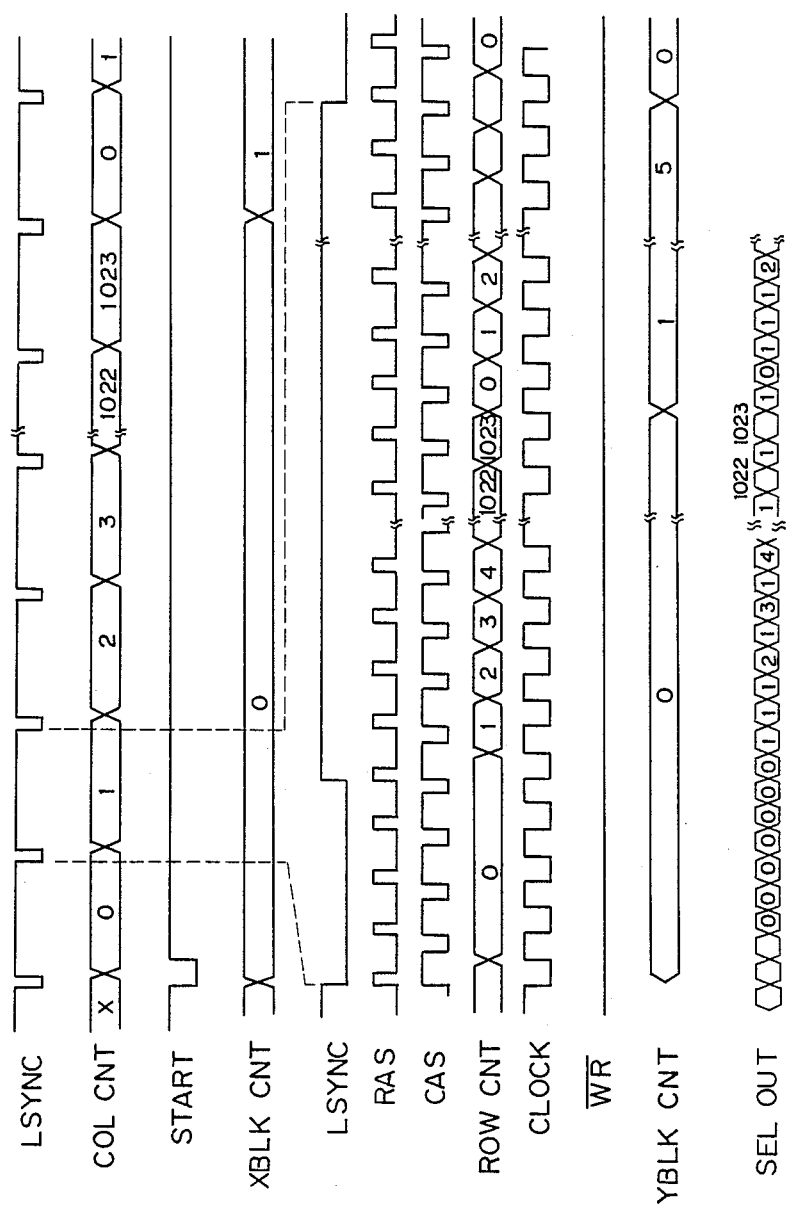
FIG. 12 is a time chart of the processing device of FIG. 10 in the operation of reading the memorized data from the memory.

Function for reading the memorized data is described hereinafter with reference to the time chart represented in FIG. 12.

At the time of starting the operation, a maximum number (1111111111111) in the binary scale of notation is loaded to the X1 counter 52 and Y1 counter 53 to turn the level of the write terminal WR of the memory 60 to "L" so that the reset of each of the row counter 56 and the column counter 57 generates only the line synchronizing signal (LSYNC) and the start signal (START), respectively, and that the input state of $\overline{WR}$ is maintained "H" unchanged.

Therefore, the written data coincides with the value of XBLK, YBLK, as illustrated in FIG. 9, in accordance with the line synchronizing signal and the start signal. For example, in FIG. 9, XBLK 0 to XBLK 6 of XBLK divisions having three bits are output on the paper, while XBLK 7 is out of the paper and not represented on the paper (also, only a part of XBLK 6 is output on the paper). Therefore, a mode selection signal (MODE SEL) is output from a decoder 58 to obtain a continuous output. Note that in FIG. 10, reference $G_3$, $G_4$ each designates an AND gate, $G_5$, $G_6$ each designates a NOR gate, $G_7$, $G_8$ each designates an OR gate and $G_9$ designates a NAND gate. Also, reference numeral 71,72 each designates a flip-flop circuit for demultiplying the clock signal frequency by one fourth (¼ CLK frequency demultiplier flip-flop) and reference numeral 73 designates a counter circuit.

According to the manner mentioned above, data of a part of the original image is repeatedly output on a paper. At the same time, a mode selection signal (MODE SEL) is transmitted to a color strength adjuster circuit for controlling color balance of darkness and lightness for red (R), green (G) and blue (B).

Figure 13A:
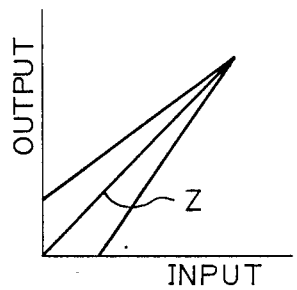
FIGS. 13a, 13b and 13c are graphical views representing examples of color strength characteristic different from each other.
Figure 13B:
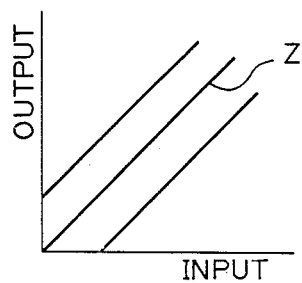
Figure 13C:
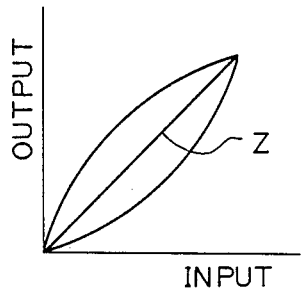

Examples of color strength balance characteristic are graphically represented in FIGS. 13(a), 13(b) and 13(c). Each of the three lines in the graphs represents the color strength output from the color balance adjuster circuit with respect to the image data input thereto. FIG. 13(a) represents the color strength characteristic in which the inclination of the color characteristic line is changed with respect to the standard line Z having 1:1 correspondence between the input and output. FIG. 13(b) represents the color strength characteristic in which the color characteristic line is shifted from and in parallel with the standard line Z. FIG. 13(c) represents the color strength characteristic in which the color characteristic line is curved with respect to the standard line Z.

Figure 14:
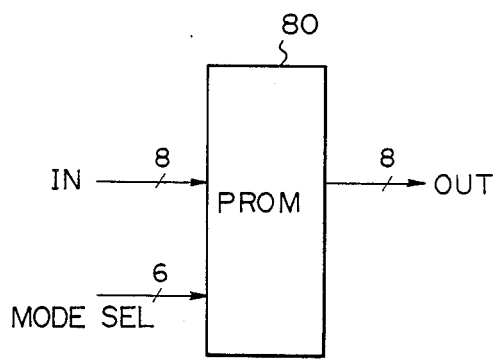
FIG. 14 is an explanatory view of an example of an image processing device for adjusting the color balance of the image to be copied and printed on the paper by the copying apparatus according to the present invention.

Actually, a PROM 80 illustrated in FIG. 14 is used as the image processing means. The color strength characteristic lines represented in FIGS. 13a, 13b, 13c are preregistered in a table in the PROM 80. The image data read out from the memory 60 of FIG. 10 is input to the PROM 80 through an input line IN. One of the three characteristic lines registered in the table in the PROM 80 is selected in accordance with the mode selection signal (MODE SEL) tranmsitted from the decoder 58.

In connection with the above mentioned color balance adjusting process, it is not always necessary to output all of the twenty seven test print samples, for example when the required copy is limited to a reddish one in the test print mode. Also, it is possible to print the test copy in an intermediate color strength between two lines of the three color characteristic lines as illustrated in FIGS. 13a to c. Further, two or more papers may be used to print test samples thereon, changing the color strength characteristic to achieve a fine adjustment of the color balance.

The above mentioned structure is not limited to be applied to adjust the color balance. For example, it is possible to compare the actual dimension of the original on the copy without measuring the size and calculating the magnification, by inputting the mode selection signal into the variable magnification processor 61 of FIG. 6 to change the magnification. It is especially useful when the magnification of the longitudinal dimension and the lateral dimension of the image is individually changed.

Also, an optimal copy can be obtained with respect to each print mode considering moiere effect by changing the smoothing coefficient and output pattern.

In connection with the example of the test print sample of FIG. 9, each block may be numbered from 0 to 35 to identify the block, so that an optimal print mode of any block having a desired color balance printed thereon can be selected by designating the number of the block and the original is copied and printed in accordance with the desired color balance of the selected sample image.

As mentioned above, in accordance with the embodiment of the present invention, there is provided a test print mode operation in which at least a part of the image of the original to be copied is memorized in the memory 60 and the memorized image data is repeatedly output on one display, each output data being processed in a different print condition. That is, one same part of the original image is repeatedly printed twenty seven times on one test copy paper in a manner that the strength of each of the three colors, red, green and blue is set as one of three stages i.e., standard, strong and light, thus total number of combination of three colors in a defferent strength becoming $27(=3^3)$. The user chooses one test sample which is considered to be desirable from the twenty seven test samples which are printed in a different color balance with respect to each other. Thereby, the user easily obtains a copy having a desired color balance. Therefore, an optimal best copy can be efficiently obtained without troublesome trial and error adjustment operations in which several or more test copies have to be printed and compared with each other in accordance with a manual guidance explanation for manipulating the copying apparatus.

As mentioned above, in accordance with the present invention, a test print mode operation is provided in which a plurality of test print samples are each processed in a different print condition and output on one display, so that a desired best copy can be easily obtained by choosing one test sample from the display and setting the print mode in accordance with the chosen sample print mode.

Many widely different embodiments of the present invention may be constructed without departing from the spirit and scope of the present invention. It should be understood that the present invention is not limited to the specific embodiments described in the specification, except as defined in the appended claims.

What is claimed is:

1. A device for adjusting a color balance of an image to be printed, used in an image generating apparatus, comprising:
   a switching means for switching an operation mode of said image generating apparatus between a test print mode and a normal print mode;
   a memory means for memorizing an image signal relating to at least a part of an original image when said switching means selects said test print mode;
   an output means for reading said memorized image signal from said memory means and repeatedly outputting said image signal a plurality of times;
   an image processing means for receiving another image signal relating to said original image when said switching means selects said normal print mode and for receiving said outputted image signal when said switching means selects said test print mode, and for processing one signal of said received another image signal and said received image signal, with a different print condition at each time when said output means outputs repeatedly said image signal; and
   an image generating means for receiving said processed one signal and for generating said image to be printed in accordance with said received one signal.

2. A device according to claim 1, wherein said different print condition is a different color balance.

3. A device according to claim 2, wherein said device further comprises an image input means for scanning said original image and for analyzing said scanned original image into three colors of red, green and blue, said image input means for supplying said analyzed original image to said memory means or said processing means.

4. A device according to claim 3, wherein said image processing means processes said image signal of said respective colors in three different color strengths in said test mode so as to output image signals having twenty-seven different color balances.

5. A device according to claim 3, wherein said image processing means comprises:
   a PROM circuit for preregistering the characteristics of color strength lines and for changing said color strength of said respective three colors of red, green and blue in accordance with said characteristics of said preregistered lines.

6. A device according to claim 1, wherein latent image is formed corresponding to said original image, and said latent images are developed by color toners of black, yellow, magenta and cyan.

7. A device according to claim 1, wherein an image having a desired color balance is printed in said normal print mode by selecting one of said generated images which are differently processed in said test print mode.

8. A device according to claim 1, wherein said device further comprises:
   a defining means defining a predetermined area of said original image, said defining means for supplying an area signal corresponding to said predetermined area to said memory means.

* * * * *